US012691586B2

(12) United States Patent
Wiersma et al.

(10) Patent No.: US 12,691,586 B2
(45) Date of Patent: Jul. 28, 2026

(54) AUTOMATED BIN-PICKING BASED ON DEEP LEARNING

(71) Applicant: FIZYR B.V., Delft (NL)

(72) Inventors: Mark Wiersma, Delft (NL); Valerio Carpani, Bologna (IT)

(73) Assignee: FIZYR B.V., Delft (NL)

( * ) Notice: Subject to any disclaimer, the term of this patent is extended or adjusted under 35 U.S.C. 154(b) by 35 days.

(21) Appl. No.: 18/702,674

(22) PCT Filed: Oct. 19, 2022

(86) PCT No.: PCT/NL2022/050594
§ 371 (c)(1),
(2) Date: Apr. 18, 2024

(87) PCT Pub. No.: WO2023/068929
PCT Pub. Date: Apr. 27, 2023

(65) Prior Publication Data
US 2024/0408766 A1 Dec. 12, 2024

(30) Foreign Application Priority Data

Oct. 19, 2021 (NL) ..................................... 2029461

(51) Int. Cl.
| | |
|---|---|
| B25J 9/16 | (2006.01) |
| G06V 10/25 | (2022.01) |
| G06V 10/82 | (2022.01) |
| G06V 20/52 | (2022.01) |

(52) U.S. Cl.
CPC ............ B25J 9/1697 (2013.01); G06V 10/25 (2022.01); G06V 10/82 (2022.01); G06V 20/52 (2022.01)

(58) Field of Classification Search
USPC ................................................ 700/245–264
See application file for complete search history.

(56) References Cited

U.S. PATENT DOCUMENTS

| | | | | |
|---|---|---|---|---|
| 9,914,213 | B2 * | 3/2018 | Vijayanarasimhan | ... B25J 9/163 |
| 10,055,667 | B2 * | 8/2018 | Konolige | ................. B25J 9/161 |
| 10,207,402 | B2 * | 2/2019 | Levine | ..................... B25J 9/161 |
| 11,030,766 | B2 * | 6/2021 | Choi | ......................... G06T 7/97 |
| 11,097,418 | B2 * | 8/2021 | Nagarajan | .............. B25J 9/1612 |

(Continued)

OTHER PUBLICATIONS

Kanoulas et al. "Curved Surface Patches for Rough Terrain Perception", CoRR, Jul. 24, 2014, 149 pages.
Levine et al. "Learning Hand-Eye Coordination for Robotic Grasping with Deep Learning and Large-Scale Data Collection", CoRR, Aug. 28, 2016, 12 pages.
Matsumoto et al. "End-to-End Learning of Object Grasp Poses in the Amazon Robotics Challenge", Workshop on Warehouse Picking Automation in IEEE ICRA, May 2017, 4 pages.

(Continued)

*Primary Examiner* — Jonathan L Sample
(74) *Attorney, Agent, or Firm* — Steven M. Koehler; Westman, Champlin & Koehler, P.A.

(57) ABSTRACT

Methods and systems for determining a grasp proposal for object picking by a robot gripper are descried wherein the method may comprise capturing an image comprising an object to be grasped by the robot gripper; providing the image to a deep neural network system that is trained to generate an object segmentation map for identifying pixels in the image that are associated with the object and to generate a plurality of object property maps, each object property map linking pixels of the object to information about a predetermined object property; and, determining a grasp proposal for a controller of the robot based on the one or more generated object property maps.

20 Claims, 10 Drawing Sheets

(56) References Cited

U.S. PATENT DOCUMENTS

| | | | | |
|---|---|---|---|---|
| 11,341,406 | B1 * | 5/2022 | Redmon | G06N 3/08 |
| 11,559,885 | B2 * | 1/2023 | Humayun | G06T 7/73 |
| 2019/0084151 | A1 * | 3/2019 | Bai | B25J 9/1697 |
| 2020/0094405 | A1 * | 3/2020 | Davidson | B25J 9/1669 |
| 2020/0094406 | A1 * | 3/2020 | Kusano | G06T 7/70 |
| 2020/0215685 | A1 * | 7/2020 | Jamali | B25J 9/1697 |
| 2020/0306980 | A1 * | 10/2020 | Choi | B25J 9/1697 |
| 2020/0311956 | A1 * | 10/2020 | Choi | G06V 10/454 |
| 2021/0023720 | A1 * | 1/2021 | Du | G06T 7/194 |
| 2021/0069904 | A1 * | 3/2021 | Duan | B25J 9/161 |
| 2021/0166393 | A1 * | 6/2021 | Ramani | G06T 7/70 |
| 2021/0187741 | A1 * | 6/2021 | Marthi | B25J 9/1676 |
| 2021/0276182 | A1 | 9/2021 | Kusano et al. | |
| 2022/0009091 | A1 * | 1/2022 | Moreno Noguer | B25J 9/1653 |
| 2022/0072707 | A1 * | 3/2022 | Fan | G06V 20/64 |
| 2022/0080581 | A1 * | 3/2022 | Wang | G06T 5/70 |
| 2022/0379475 | A1 * | 12/2022 | Tang | H04N 13/239 |
| 2022/0383538 | A1 * | 12/2022 | Tang | B25J 9/1697 |

OTHER PUBLICATIONS

Vona, M. and Kanoulas, D., "Curved Surface Contact Patches with Quantified Uncertainty", International Conference on Intelligent Robots and Systems, IEEE/RSJ, 2011, 8 pages.

Wada et al. "3D Object Segmentation for Shelf Bin Picking by Humanoid with Deep Learning and Occupancy Voxel Grid Map", 2016 IEEE-RAS 16th International Conference on Humanoid Robots (HUMANOIDS), Nov. 15, 2016, pp. 1149-1154.

Yu et al. "A Cascaded Deep Learning Framework for Real-time and Robust Grasp Planning", 2019 IEEE International Conference on Robotics and Biomimetics (ROBIO), 2019, pp. 1380-1386.

Zeng et al. "Robotic Pick-and-Place of Novel Objects in Clutter with Multi-Affordance Grasping and Cross-Domain Image Matching", The International Journal of Robotics Research, 2017, 14 pages.

International Search Report and Written Opinion in corresponding International Application No. PCT/NL2022/050594 dated Mar. 15, 2023.

* cited by examiner providing training data, comprising an image comprising an object to be grasped by a robot gripper, to the input of a deep neural network system comprising a plurality output branches, each output branch being associated with a deep neural network, the training data further comprising coordinates of an object segmentation mask associated with the object in the image and a plurality of object property maps, each object property map linking pixels of the object in the image to information about a predetermined object property.

502 training the deep neural network system based on the training data, wherein the training includes evaluating the outputs of the plurality output branches based on a loss function using the coordinates of the object mask and the plurality of object property maps as a target and adjusting training parameters (e.g. weights of the activation functions of the neural network) of the deep neural network system based on the evaluation of the loss function.

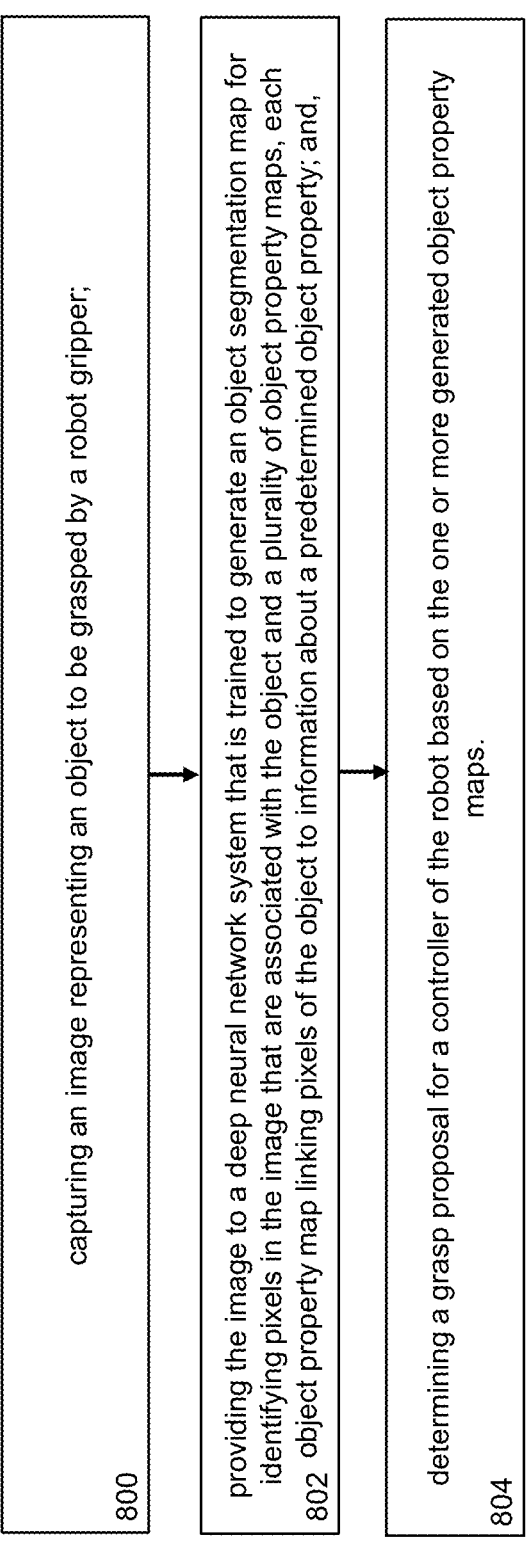

capturing an image representing an object to be grasped by a robot gripper;

800 providing the image to a deep neural network system that is trained to generate an object segmentation map for identifying pixels in the image that are associated with the object and a plurality of object property maps, each object property map linking pixels of the object to information about a predetermined object property; and,

802 determining a grasp proposal for a controller of the robot based on the one or more generated object property maps.

AUTOMATED BIN-PICKING BASED ON DEEP LEARNING

CROSS-REFERENCE TO RELATED APPLICATION(S)

This Application is a Section 371 National Stage Application of International Application No. PCT/NL2022/050594, filed Oct. 19, 2022 and published as WO 2023/068929 A1 on Apr. 27, 2023, in English.

TECHNICAL FIELD

The disclosure relates to automated bin-picking based on deep learning and, in particular, though not exclusively, to methods and systems for automatic bin-picking based on deep learning, and a computer program product for performing such methods.

BACKGROUND

Automated bin-picking is a difficult task that requires solving multiple robotic vision problems including object detection and grasp proposal generation. The items inside the bin need to be identified, recognized and subsequently a plan must be made for how to grab and move them. While humans are able to able to perform these actions in an instance by just looking at them, for robots reaching such human-level performance has not been reached yet. As warehouses and storage facilities keep pushing forwards with automation it is important that robots become capable of dealing with the complexity and unpredictability of the task of taking items out of boxes, which hereafter is referred to as the bin-picking problem.

Determining a graspable pose requires localizing potential grasp areas on an object. The methods for finding these graspable areas can be divided into roughly two different approaches. The first approach uses a database of objects with pre-determined grasp locations. The graspable objects are matched with the database for either local or global features. The biggest downside of these methods is that it is unable to deal with unknown objects without adding them to the database. This way, searching the database can quickly become a time-inefficient method. Alternatively, the database may comprise simplified shapes such as cubes and cylinders that can then be matched to parts of the objects. However, the simplification of the object discards local deviations that can lead to unreliable grasp proposals.

The second approach forgoes matching specific shapes and instead analyses local features on the object. Some analytical methods use mathematical models of either the gripper or the grasping surface to determine the graspability of a patch. For example, DexNet-3.0 is a compliant suction contact model including phases. First, the model measures whether a seal can be formed between the suction cup and the object surface, then an analysis of the grasp's ability to resist external wrenches if performed. By sampling and analyzing multiple locations on a point cloud, an optimal grasp location can be found. In another approach, contact surface patches may be used to determine whether a location on the object is graspable. The surface type is modeled based on the size, curvature and orientation of the sampled neighborhood. The patches are then filtered using a residual/coverage evaluation that determine whether enough points support the proposed patch. The remaining patches are then filtered based on a final set of criteria. The downside of these analytical methods is that they are computationally expensive resulting in a trade-off between runtime and accuracy.

Recent efforts make use of convolutional neural networks to analyze local features instead of costly mathematical models. A grasp proposal network either performs direct grasp regression on an input to determine a suitable grasp representation or returns a grasp quality score for (parts of) the input. When it comes to generating grasp proposals for suction cup grippers, the current leading methods use pixel-wise affordance maps. For example, Matsumoto et al. "*End-to-end learning of object grasp poses in the amazon robotics challenge,*" Workshop on Warehouse Picking Automation in IEEE ICRA, May 2017 use an Encoder-Decoder network to simultaneously perform pixel-wise object segmentation and grasp affordance calculation. The result is single-shot network that quickly performs all the necessary vision tasks required for bin-picking.

Training a deep neural network how to generate grasp proposals requires however custom training data. This data can be collected based on human labeling as e.g. described by A. Zeng et al, "*Robotic pick-and-place of novel objects in clutter with multi-affordance grasping and cross-domain image matching,*" CoRR, vol. abs/1710.01330, 2017, physical experiments as described by S. Levine et al, "*Learning hand-eye coordination for robotic grasping with deep learning and large-scale data collection,*" CoRR, vol. abs/1603.02199, 2016, or simulations as described by Yu, Q. et al, "A cascaded deep learning framework for real-time and robust grasp planning," 2019 IEEE International Conference on Robotics and Biomimetics (ROBIO), pp. 1380-1386, 2019.

Regardless of the method used to generate the data, the decision of what can and cannot be grasped is always part of the dataset and taught directly to the neural network resulting in training data that is either inaccurate, incomplete or relevant only to a specific hardware setup. Hence, the training method binds the network to a specific decision-making process that is built into the dataset. Hence, from the above, it follows that there is a need in the art for improved methods and systems for automatic bin-picking.

SUMMARY

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including a functional or an object oriented programming language such as Java™, Scala, C++, Python or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer, server or virtualized server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), or graphics processing unit (GPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is an objective of the embodiments in this disclosure to reduce or eliminate at least one of the drawbacks known in the prior art. The invention regards a novel approach to grasp proposal generation using trained deep neural networks.

In an aspect, the invention may relate to a method of determining a grasp proposal for object picking by a robot comprising. The method may including the steps of: capturing an image representing an object to be grasped by a robot gripper; providing the image to a deep neural network system that is trained to generate an object segmentation map for identifying pixels in the image that are associated with the object and a plurality of object property maps, each object property map linking pixels of the object to information about a predetermined object property; and, determining a grasp proposal for a controller of the robot based on the one or more generated object property maps.

In an embodiment, a grasp proposal for a controller of the robot is determined using an algorithm and the one or more generated object property maps generated by the deep neural network system, wherein the algorithm is not based on a trainable model, such as a machine learning model or a deep learning model.

Hence, the object grasping scheme uses a network architecture that performs object detection and generates a plurality of different object property maps associated with different properties based on the training data, and a separate decision-making algorithm that does not require training based on training data and that uses the network output to determine a grasp location. This way, the decision of where to grasp is removed from the deep neural network to allow for more flexibility in gripper choice without the need to re-train the network.

In an embodiment, the algorithm is configurable for different gripper designs. In an embodiment, the algorithm is an algorithm that does not require training of a model such a machine learning model or a deep learning model.

In an embodiment, an object property map may define a pixel-labelled image wherein each pixel value of the object property map defines a measurable object property at pixel locations of the image.

In an embodiment, the plurality of object property maps may comprise an angle property map wherein a pixel value of the angle map property that is associated with the object includes information about a (normalized) angle $\theta_{x,y}$ between a z-axis (parallel to the direction of gravity) in the world-frame of the object and a vector that is normal to the surface of the object at the pixel location.

In an embodiment, the plurality of object property maps may comprise a curvature property map wherein a pixel value of the curvature property map that is associated with the object includes information about a (primary) curvature of the object at the pixel location.

In an embodiment, the plurality of object property maps may comprise a distance property map which is computed based on the curvature property map, wherein for each non-zero pixel value of the curvature map a distance, e.g. the Euclidean distance, to the nearest zero pixel value is computed.

In an embodiment, the object property maps may comprise a coverage property map wherein a pixel value of the curvature property map that is associated with the object includes information about an edge and/or an overhanging surface of the object at the pixel location.

In an embodiment, the determining a grasp proposal may further include: determining a score map by combining information of different object property maps, preferably the combining including pixel-wise multiplication of pixel values in the different object property maps; determining one or more surfaces of the object based on the score map, preferably based pixels that have a high score value according to the score map.

Further, a separate algorithm may be used which is configured to decide where to grasp based on the object properties map, i.e. the output of the trained deep neural network. The algorithm may be configured to maximize a graspable area for a particular bin-picking technology based on object property maps generated by the trained deep neural network. For example, the algorithm may select a graspable area that ensures a good surface for a robot gripper that may be used for bin-picking, for example a good seal for a vacuum gripper.

In an embodiment, the deep neural network may be configured to simultaneously generate the segmentation mask and the plurality of object property maps.

The deep neural network system may include a first deep neural network system configured to generate Regions of Interests ROIs in the images. The deep neural network further includes a second deep neural network system that receives the ROIs as input and that includes multiple branches, wherein each branch represents a deep neural network that is configured to perform a certain task.

For example, one branch may be associated with a deep neural network configured to predict the class and a bounding box for a ROI. A second branch may be associated with a deep neural network configured to predict a mask an object in a ROI. Further branches may be associated with deep neural networks that are configured to generate the different object property maps.

Hence, this way, the deep neural network system is configured to efficiently (i.e. simultaneously) determine the segmentation map and the object property maps of an object that is in an image.

The deep neural network system may use an architecture that is similar to the mask-RNN with the addition of the branches that are configured to generate the object property maps. Such deep neural network architecture has proven to be very fast and efficient, which is important for real-time generation of grasp proposals. Thus, the deep neural network architecture described with reference to the embodiments in this disclosure does not propose grasp locations but instead produces object property maps describing measurable physical object properties of an object as a function of location, while simultaneously detecting and classifying items in an image. This way, the deep neural network can simultaneously perform all the vision tasks required for bin-picking. Based on object property maps, grasping locations can be determined based on custom criteria. The deep neural network architecture may be referred to as map-grasp.

In an embodiment, the image may include a 2D image frame and a point cloud, preferably a point cloud that is pixel-aligned with the 2D image frame. Hence, different types of image data may be used to efficiently generate the grasp proposals.

In an embodiment, the deep neural network system may comprise a plurality output branches, each output branch being associated with a deep neural network that is trained to generate one of the plurality of object property maps.

In an embodiment, the trained deep neural network system is configured to simultaneously generate the object segmentation map and the plurality of object property maps.

In a further aspect, the invention may relate to a method of training a deep neural network for object picking by a robot gripper comprising: providing training data, comprising an image comprising an object to be grasped by the robot gripper, to the input of a deep neural network system comprising a plurality output branches, each output branch being associated with a deep neural network, the training data further comprising coordinates of an object segmentation mask associated with the object in the image and a plurality of object property maps, each object property map linking pixels of the object in the image to information about a predetermined object property; and, training the deep neural network system based on the training data, wherein the training includes evaluating the outputs of the plurality output branches based on a loss function using the coordinates of the object mask and the plurality of object property maps as a target and adjusting training parameters (e.g. weights of the activation functions of the neural network) of the deep neural network system based on the evaluation of the loss function.

In an embodiment, the deep neural network being trained based on the training data to generate an object segmentation map for identifying pixels in the image that are associated with the object and to generate a plurality of object property maps, each object property map linking pixels of the object to information about a predetermined object property.

In a further embodiment, the deep neural network system may be trained to simultaneously generate a segmentation mask and a plurality of object property maps based on the image that is provided to the input.

In another embodiment, the invention may relate to a robot system configured to grasp an object comprising: a robotic system including a controller for controlling a gripper for grasping one or more objects; an imaging system for capturing images of the one or more objects; a computer connected to the robotic system and the imaging system, the computer comprising a computer readable storage medium having computer readable program code embodied therewith; and a processor, coupled to the computer readable storage medium, wherein responsive to executing the computer readable program code, the processor is configured to perform executable operations comprising: capturing an image representing an object to be grasped by the gripper; providing the image to a deep neural network system that is trained to generate a segmentation map for identifying pixels in the image that are associated with the object and to generate a plurality of property maps, each object property map linking pixels of the object to information about a predetermined object property; and, determining a grasp proposal for the robot controller based on the one or more generated object property maps.

In yet another aspect, the invention may relate to a method of automatic generation of training data for training a deep neural network comprising: capturing image data associated with one or more objects to be picked up by a robot gripper, the image data including a 2D image and an associated (pixel-aligned) point cloud; determining a plurality of locations on the point cloud and using a patch fitting algorithm to fit points of the point cloud associated with each of the plurality of locations to a curved surface patch, each surface patch being associated with one or more patch parameters defining at least one of an orientation of a surface patch in a reference frame of the object, a curvature of the surface patch, or, dimensions of the surface patch; determining one or more object property maps based on the one or more patch parameters, the object property map linking pixels of the object in the 2D image to information about a predetermined object property.

In an embodiment, determining one or more object property maps may include: determining an angle property map based on the one or more patch parameters defining an orientation of the plurality of surface patches in a reference frame of the object; and/or, determining a curvature property map based on the one or more patch parameters defining curvature of the plurality of surface patches.

Hence, a patch fitting algorithm may be used to fit parts of a point cloud representing an object to be picked up by a gripper to a predetermined patch defining a surface having a predetermined orientation in the reference frame of the object and a predetermined curvature. Information associated with these patches may then be encoded into a object property map. This way, 3D information of an object may be encoded in (2D) object property map that is associated with a 2D image of the object that was captured at the same moment when the point cloud was generated.

Hence, the invention relates to an automatic data generation method that uses depth images to create object property maps that describe the physical properties of the objects in a depth image. Such object property maps may be used by a bin-picking system to decide where to grasp an object based on the hardware specifications of the object, without the need to encode that decision into the dataset.

The invention may also relate to a computer program or suite of computer programs comprising at least one software code portion or a computer program product storing at least one software code portion, the software code portion, when run on a computer system, being configured for executing any of the method steps described above.

The invention may further relate to a non-transitory computer-readable storage medium storing at least one software code portion, the software code portion, when executed or processed by a computer, is configured to perform any of the method steps as described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 5 depicts a method for training a neural network-based object property map generator according to an embodiment;

FIG. 8 illustrates a method for determining a grasp proposal according to an embodiment.

DETAILED DESCRIPTION

Figure 1:
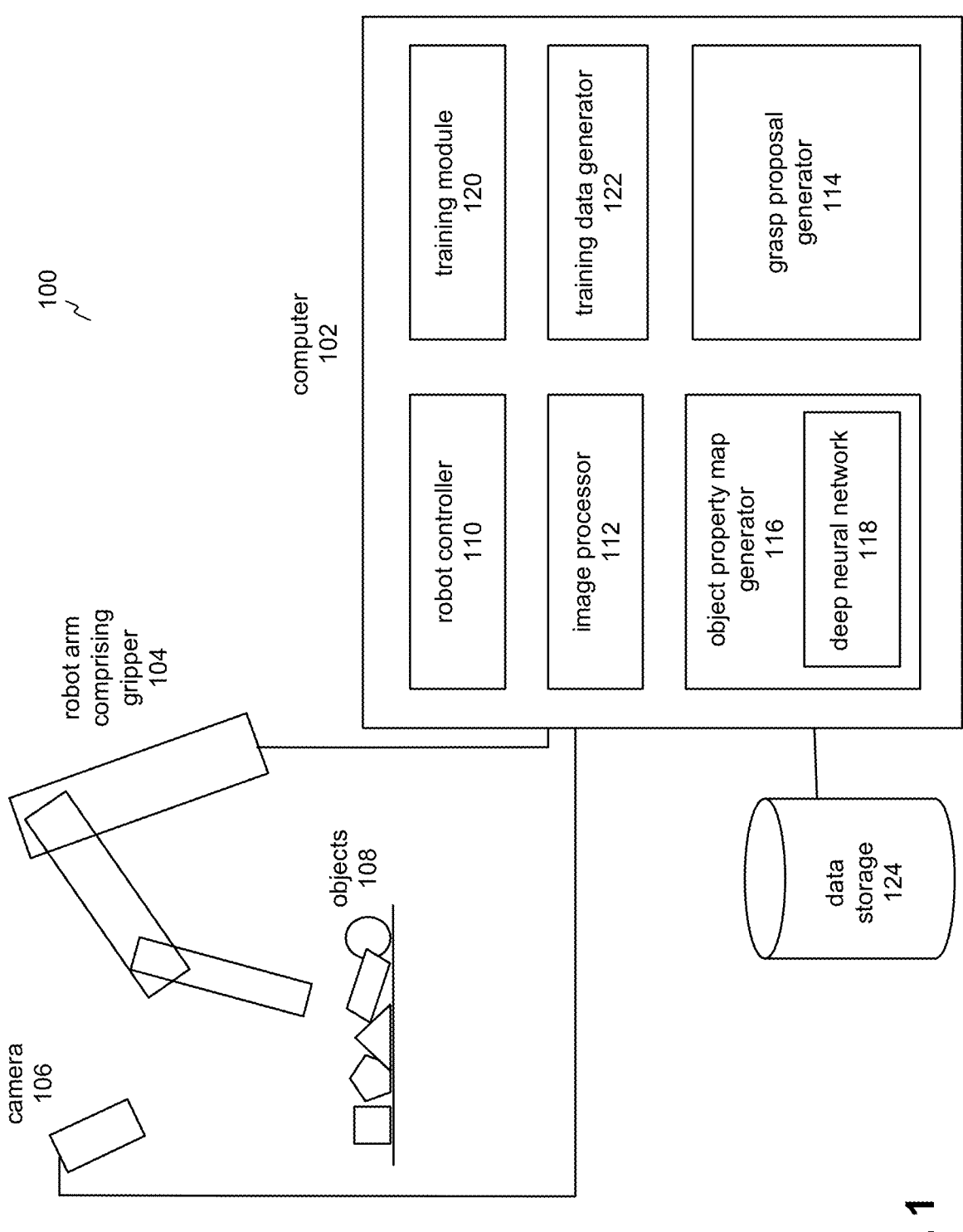
FIG. 1 depicts an object gripping system according to an embodiment.

FIG. 1 depicts an object gripping system according to an embodiment. In particular, the figure depicts an object gripping system 100 comprising a computer system 102 connected to a robot arm 104 comprising a gripper configured to grasp one or more objects 108 that are arranged on a surface. The computer system is further connected to a camera system 106 which is configured to capture images of the objects. The camera system may include a 3D camera to capture 3D image data of the objects. The computer system may further a robot controller 110 for controlling the robot arm and an image processor 112 for analysing the images captured by the video system.

The system further includes a grasp proposal generator 114 for generating one or more grasp proposals, i.e. information for the robot controller enabling the robot arm to successfully grasp the objects. Known grasp proposal algorithms may be based on trained deep learning-based algorithms have been designed that use neural networks (NNs) to solve parts of the bin-picking problem. Typically, these deep neural networks are trained to generate grasp proposals based on custom training data associated with a specific hardware setup. These training data can be collected based on human labeling, physical experiments, or simulations. When using such scheme, the decision of what can and cannot be grasped is always part of the dataset and taught directly to the NN resulting in training data, regardless of the method used to generate the data. This will result in a grasp proposal that are either inaccurate, incomplete, or relevant only to a specific hardware setup.

To address this problem, the object gripping system may include an object property map generator 116 comprising a deep neural network system which does not propose grasp locations but instead produces so-called object property maps describing measurable physical object properties of objects in images captured by the camera system, while simultaneously detecting and classifying the objects in the images. As will be described hereunder in more detail, the object property map provides spatial information about a certain property of the object, e.g. the curvature of its surface, the grasp proposal generator 114 is configured to receive object property maps and to determine the one or more grasp proposals based on the object property maps. As will be described hereunder, the object property maps are generated based on image data of the objects and thus constitute datasets which are not bound to specific hardware, while still enabling grasp proposal generator to generate accurate grasp proposals.

Figure 2:
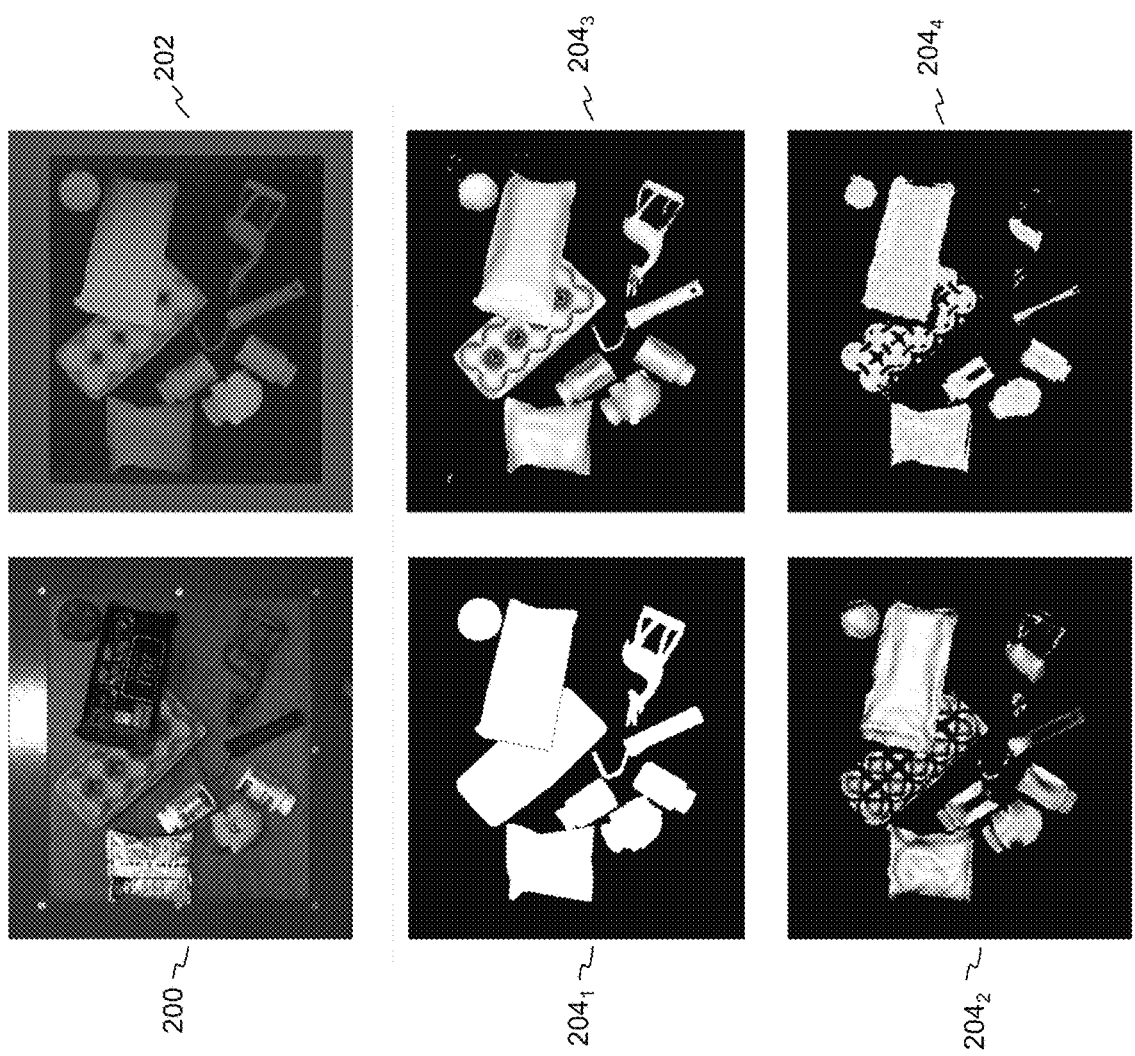
FIG. 2 depict images of objects and object property maps of the imaged objects that are used for determining object grasp proposals.

FIG. 2 depicts images of objects and object property maps of the imaged objects that that are used to train the object property map generator. As shown in the figure, the image data of the objects may include an image 200, e.g. an RGB image, of one or more objects to be picked up by a robot gripper and a depth map 202 which may be determined based on point cloud data of the one or more objects. Such images may be generated using a 3D camera, which is capable of (simultaneously) determining a 2D RGB image and a point cloud representing a 3D surface model of the one or more objects. The image and the point cloud have the same resolution and pixel-aligned so that each pixel in the image can be associated with a point from the point cloud.

The training data may include image data, one or more images, such as RGB images, of object to be picked up by a robot gripper and object property maps associated with the images. An object property map may provide an unambiguous metric for determining graspability for the gripper of the robot arm. Object property maps may be implemented as grayscale images of the same resolution as the images so that each location (e.g. pixel or group of pixels) in the map is connected to a location (e.g. a pixel or a group of pixels) in the RGB image. This way each value in the property map provides information about a specific object property at each pixel location in the image. The generation of a property map may depend on the property it describes and could be realized by automatic generation and/and hand-annotation.

FIG. 2 illustrates examples of different object property maps which may be created based the image and a point cloud, which may include (but not limited to) a segmentation mask 2021, an angle property mask 2022, curvature property mask 2023 and/or coverage property map 2024. These object property maps are created based on patches, i.e. a local group of points from the point cloud. An example of a patch fitting algorithm is described in the article by Vona et al, "*Curved surface contact patches with quantified uncertainty*" International Conference on Intelligent Robots and Systems, 2011 IEEE/RSJ, pp. 1439-1446, which herewith may be incorporated by reference into this application.

The algorithm uses a selection of different, e.g. ten, surface patch models including parabolical patches (elliptic, hyperbolic, cylindric, circular, planes (rectangular, convex quad, circle or ellipts boundary) and non-parabolic patches (spherical and circular cylindrical). The paraboloid patches are representative of more natural shapes while the non-paraboloid patches, a perfect sphere and cylinder, are more common in man-made objects. Each patch defines one sheet quadric with a set of two independent principal curvatures $\kappa_x$, $\kappa_y$ in orthogonal directions around a symmetry point c. Each patch boundary may be described by a set of dimensions $d_x$, $d_y$ which are either the radii for an elliptical, or half-widths for rectangular patch boundaries. A final orientation vector r is used to describe the patch's orientation from which the rotation of the patch in relation to the world frame can be determined. The algorithm uses weighted Levenberg-Marquardt optimization to determine a patch type and its parameters of a particular surface.

Hence, a patch fitting algorithm is used to fit parts of a point cloud representing an object to be picked up by a gripper to a predetermined patch defining a surface having a predetermined orientation in the reference frame of the object and a predetermined curvature. Information associated with these patches may then be encoded into an object property map. This way, 3D information of an object may be encoded in (2D) object property map.

In an embodiment, the object property maps may include an angle property map. The angle property map is used to help find a grasp location where the angle of approach is as vertical as possible. Grasping vertically, in-line with gravity, reduces the shearing forces on a vacuum head that could cause the vacuum seal to fail. Creating the angle property map includes determining the surface normal at each location. In an embodiment, the surface normal can be determined by computing the eigenvector relating to the smallest eigenvalue of the local covariance matrix. In another embodiment, the angle property maps may be determined based on a fitted patch using its rotation matrix. The angle $\theta_{x,y}$ may represent an angle between a vector $[0, 0, 1]^T$, representing the z-axis in the world-frame in the opposite direction of gravity, and the z-axis in the patch's local frame. The calculated angle is then scaled to a score between 0 and 1 to create the property map $M_{angle}$ according to (equation 1):

$$M_{angle}(x, y) = \begin{cases} 0 & \text{if } |\theta_{x,y}| \geq \dfrac{\pi}{2} \\ 1 - \dfrac{|\theta_{x,y}|}{\pi/2} & \text{if } 0 < |\theta_{x,y}| < \dfrac{\pi}{2} \\ 1 & \text{if } \theta_{x,y} = 0 \end{cases} \quad (1)$$

Here, higher values represent the surface normal of the object pointing straight up parallel to the z-axis. In contrast, lower pixel values represent surface angle angles away from the optimal direction of approach. Using a pixel-aligned point cloud, such property map may be automatically generated and linked back to (or mapped onto) the pixels of an RGB image.

In an embodiment, the object property maps may include a curvature property map. The curvature property map describes the primary curvature of an object surface at a sampled location. Its main purpose as a property map is to help avoid areas where the curvature is too high to form a proper gripping area, e.g. a proper seal in case a vacuum gripper is used. The curvature property map may be generated based on a point cloud. A patch fitting algorithm may be used to find a surface patch using a patch radius of a predetermined dimension. A curvature map may then be built based on the curvatures $\kappa_{x,y}$ of these patches by mapping the values to a score between 0 and 1 using the following expression (equation 2):

$$M_{curv}(x, y) = \begin{cases} 0 & \text{if } |\kappa_{x,y}| \geq \kappa_{max} \\ 1 - \dfrac{|\kappa_{x,y}|}{\kappa_{max}} & \text{if } 0 < |\kappa_{x,y}| < \kappa_{max} \\ 1 & \text{if } \kappa_{x,y} = 0 \end{cases} \quad (2)$$

wherein $\kappa_{x,y}$ is extracted from the fitted patch using the following rule:

$$\kappa_{(x,y)} = \max\{|\kappa_x(x, y)|, |\kappa_y(x, y)|\}$$

This way, curvature property maps may be created wherein brighter areas represent flatter surfaces where the curvature is lowest and darker areas on objects indicate curvature close to, or even exceeding, $\kappa_{max}$.

In an embodiment, the object property maps may include a coverage property map. The coverage property map is created using the coverage evaluation designed by Kanoulas et al "*Curved surface patches for rough terrain perception*". CoRR, abs/1612.06164, 2016 http://arxiv.org/abs/1612.06164, which may be incorporated by reference into this application. The coverage evaluation algorithm provides a measure of how well the fitted patch is supported by the local point cloud data. The coverage is calculated by first generating an axis-aligned grid on the xy plane of the local patch frame. Then, the patch boundary and data points are projected onto this grid. Each cell in the grid is checked to see how many points it contains. For example, a cell needs to contain at least 5 points and a patch is considered good when 80% of the cells are supported. A coverage maps may use a percentage of good cells as the values for the pixels which is scaled between 0 and 1. The nature of the coverage map makes it suitable for finding object edges and overhanging surfaces.

A segmentation mask may be generated using a known segmentation mask generating algorithms such as Mask-RCNN. The segmentation mask may label pixels with an object property. For example, a basic (binary) object property such as "object" or "no object" may be used. Such function may be used as a baseline object property map, which can be used to segment other property maps. A training dataset of segmentation masks may be realized using a pre-trained segmentation network, or alternatively through manual annotation.

A depth map may also be included as a learnable property map. It can help determine which object to pick first as it can show which objects lie at or near the top of the bin. During the dataset generation, the depth map can be directly determined from the pixel-aligned point cloud. A depth map may be created by normalizing the values from the point cloud to be between 0 and 1.

While the embodiments describe examples of object property maps for vacuum type grippers, the invention is not limited thereto. Hence, object property maps for other types of grippers are also foreseen, for example empty approach area for pinch grippers or areas with high friction material.

Figure 3:
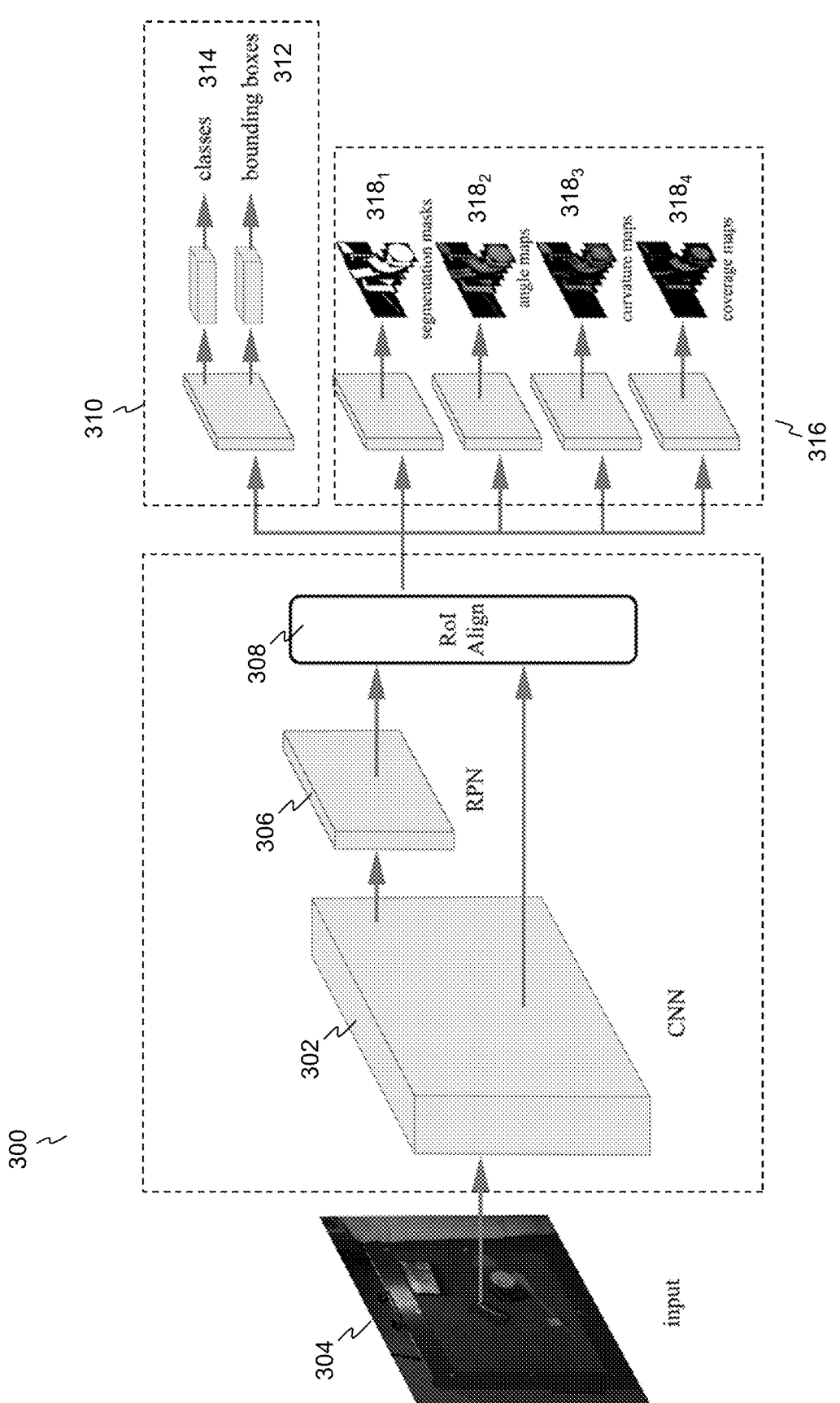
FIG. 3 depicts a neural network-based object property map generator according to an embodiment.

FIG. 3 depicts object property map generator according to an embodiment. In particular, the figure depicts the architecture of a deep neural network system 300 that is configured to generate object property maps. The deep neural network scheme may be referred to as Map-Grasp, which is partly based on the architecture of known classification and segmentation networks such as Faster R-CNN, which provides a class label and bounding-box offsets, and Mask R-CNN, which expands the output to segmentation masks for each candidate object. As will be described hereunder in more detail, Map-Grasp includes additional output branches which are configured to generate object property maps, which are used by the grasp proposal generator to determine grasp proposals for the robotized gripper.

Map-Grasp uses a multi-stage network to produce a variety of useful information for bin-picking. As shown in the figure, the system 300 includes a two-stage approach for its predictions. A first stage 301 of the deep neural network system may include a convolutional deep neural network (CNN) 302 which is used as the backbone for the entire network. For example, a ResNet-50, including pre-trained layers for general image classification, may be used for the CNN. The CNN may include an input for receiving image data 304 and an output that may be used by different algorithms, including a region proposal network 306 (RPN) that determines points of interest of the input image. The region proposal network may further be configured to determine candidate object bounding boxes that are used to extract regions of interest (RoI) based on a RoIAlign network 308.

A second stage of the network takes the RoI from the first stage as input and then splits up different functional branches. There is a first branch 310 including a deep neural network configured to predict the class 312 and bounding box offsets 314 for a RoI and a second branch 316 associated with the different object property maps 31814. For their mask prediction, Mask R-CNN decoupled class and mask by predicting a segmentation mask for each possible class and then selecting the one corresponding to the predicted class.

At the input it takes a single RGB image which is then fed through the first part of the network which is a series of convolutional layers forming a CNN. The CNN may be based on a pre-trained network. For example, the CNN may have a ResNet, e.g. a ResNet50, architecture, which is pre-trained based on the Microsoft COCO dataset. This backbone is used to produce feature maps from which a region proposal network (RPN) 310 suggests regions of interest (RoI). The best scoring RoIs are then used to extract the data from the previous feature map using a RoIAlign layer which resizes the RoI, packs them together and then feeds them through the rest of the network.

The second part of the network comprises of multiple output branches 310, 316, each of which incudes a deep neural network that is configured to perform a specific function. For example, a first output branch 310 includes a first deep neural network that is configured to generate a class 314 and bounding box 312, similar to the original output of a Faster-RCNN. For the class prediction, the first deep neural network may be configured to produce a vector of length n wherein n represents the amount of possible classes. The values in this vector may be computed by the network through a sigmoid activation function which results in a likelihood score for each class. The bounding box prediction is used to fine-tune the initial RoI proposals and produces a definitive bounding box. Its output consists of n×4 values where each set of 4 values describes the offsets to the coordinates and dimensions of the original RoI. A bounding box may be selected as output by picking the one that corresponds to the class with the highest likelihood as proposed by the classification branch.

A further output branch includes a second deep neural network 316 that is configured to segment images to generate object masks, i.e. sets of pixels in an image that relate to one particular object class. This segmentation mask prediction branch feeds RoIs originating from the RoIAlign through a series of convolutional and deconvolutional layers to propose an object mask, for example a 28×28 object mask. As with the bounding boxes, a mask is produced for each class and the classification branch may be used to decide which of these masks is used.

A further set of output branch relate to a plurality of deep neural networks, each being configured to generate an object property map. The layers of these deep neural network may have the same structure as the segmentation branch and produce varying maps describing object properties at each pixel. Like the segmentation branch, a property map is generated for each possible class after which one is chosen based on the class prediction output. In this example, the network may include neural networks which are configured to generate an angle property map 3181, a curvature property map 3182 and coverage property map 3183.

Figure 4:
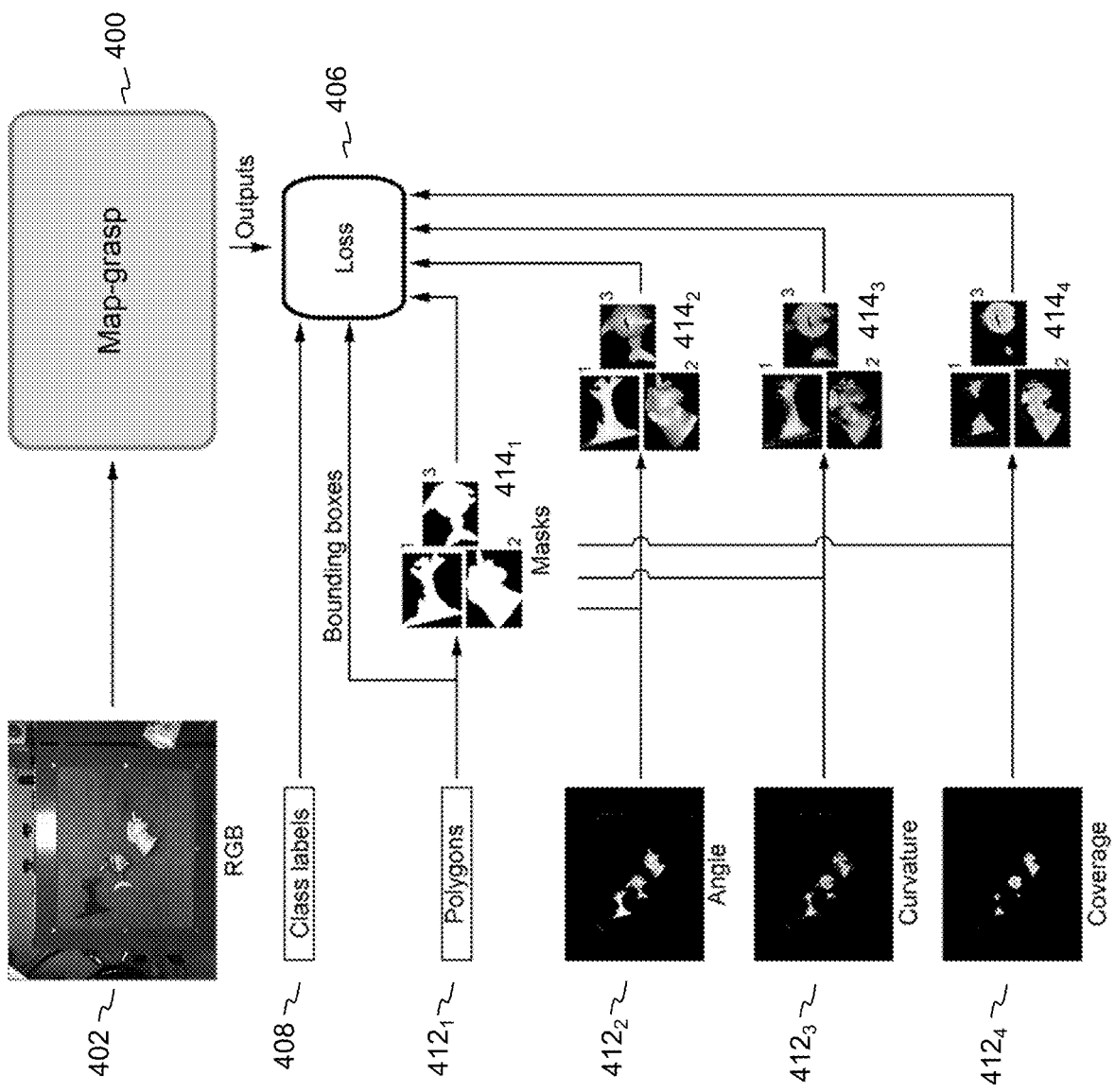
FIG. 4 illustrates the training of the object property map generator according to an embodiment.

FIG. 4 illustrates the training of the object property map generator according to an embodiment. The network may be trained based on a training set as described with reference to FIG. 1. The training data includes of an RGB image 402, a list of (segmentation) object mask coordinates 413, a list of corresponding classes 408 and the grayscale images of the property maps 412$_{1-3}$. Here, a set of object mask coordinates may define the outline of an object in the RGB image. The RGB image is meant as the input for the network. The rest of the data is used to create the training targets for the deep neural network system 400 representing the object property map generator. While the outline of a polygon may determine the segmentation masks for each object, the outermost coordinates of the polygon may be used to create the target bounding boxes. The resulting segmentation masks may be used to cut the target property maps from their image data.

The deep neural network system may be trained based on the training data by minimizing a specific loss function. Based on the evaluation by the loss function, training parameters (e.g. weights of the activation functions of the deep neural network) may be adjusted using well-known algorithms that are based on backpropagation and gradient descent. For a neural network system like Map-Grasp that executes multiple data processing functions at the same time, the total loss is a multi-task loss computed based on the sum of losses produced by each of the output branches. Since a single pass through the network produces multiple RoI, the loss for each output branch is the sum of losses for each RoI. The ground-truth value that each RoI may be compared against is determined by matching each RoI with the closest ground-truth bounding box. An RoI is only considered valid if it has an IoU with a ground-truth box of at least 0.5. In order to prevent more than one detection of an object when multiple RoIs are matched with the same bounding box, only the highest scoring RoI is kept as a positive detection. Any non-matched RoI does not influence the loss function.

The classification output produces the classification loss $L_{cls}$. A well-known cross-entropy loss for classification tasks defined as (equation 3):

$$L_{cls} = -\sum_{i=1}^{n} y_i \log(p(y_i))$$

where y is the ground truth as a vector of size n with n the total amount of possible classes and $y_i$ is the label for the i-th class. The value $p(y_i)$ is the Softmax probability for the i-th class as predicted by the network.

The bounding box loss may be calculated using the bounding box regression target $s_r=(t_x, t_y, t_w, t_h)$ which are the offsets between an RoI and its matched bounding box. Although the network produces n bounding box regression offsets, it only uses a single set of predictions $v=(v_x, v_y, v_w, v_h)$ for its loss calculation based on the predicted class. Like the classification loss, the bounding box loss function is defined as the Smooth $L_1$-loss function as used in the Fast-R-CNN (equation 4):

$$L_{bbx} = \sum_{i \in [x,y,w,h]} L_{1;smooth}(t_i - v_i) \quad \text{where}$$

$$L_{1;smooth}(x) = \begin{cases} 0.5x^2 & \text{if } |x| < 1 \\ |x| - 0.5 & \text{otherwise} \end{cases}$$

This loss function is designed to reduce sensitivity to outliers compared to a regular $L_2$ loss function.

The mask loss function is similar to the one used in Mask-RCNN. Like with the bounding boxes, the network produces n masks for each valid RoI from which only one contributes to the loss based on the class prediction. The loss function used on the mask predictions is the so-called binary cross-entropy (BCE), which, for the mask loss, is defined as (equation 5):

$$L_{mask} = -\frac{1}{N}\sum_{i=1}^{N} y_i \cdot \log(p(y_i)) + (1 - y_i) \cdot \log(1 - p(y_i))$$

Here N is the amount of pixels in the mask, yi is again the ground truth label for pixel i and similarly, $p(y_i)$ is the predicted probability for that pixel to be part of the mask. It is similar to the cross-entropy Loss in equation with 1 the difference that it does not ignore negative labels. With BCE for the mask loss, a pixel that is incorrectly predicted as background is punished in the same way as a pixel that is incorrectly predicted as part of the mask.

The loss function of the property maps is a reconstruction loss that rates the similarity between the ground truth and the prediction. Since the target values are between 0 and 1, the same BCE function can be used for the property map loss that is used in the mask prediction branch. When used as a reconstruction loss, the BCE introduces a bias towards 0.5 because of its non-linearity which can result in slightly more blurred output. This blurring can help smooth out the noise in the training data which especially present in the coverage maps. The most important task of the predicted property maps is finding the areas with the highest and lowest values which can be accurately done with BCE as a reconstruction loss (equation 6).

$$L_{map} = -\frac{1}{N}\sum_{i=1}^{N} y_i \cdot \log(p(y_i)) + (1 - y_i) \cdot \log(1 - p(y_i))$$

Where again N is the number of pixels, $y_i$ are the ground truth labels and $p(y_i)$ the predicted value at that location. This function is used to determine each of the property map loss functions. Further, object property map losses may be defined as $L_{angle}$, $L_{curv}$ and $L_{cov}$. The total loss for an image may be determined by (equation 7):

$$L_{total} = \sum_{i=1}^{R} L_{cls}^i + L_{bbx}^i + L_{mask}^i + L_{angle}^i + L_{curv}^i + L_{cov}^i$$

where R is the amount of valid RoI. For the experiments described below, the network is trained for 10 epochs on the dataset created on the basis of images and property maps as described with reference to FIG. 2. A using a Batch-size of 1 and an Adam optimizer with $\alpha$=0.0001, $\beta_1$=0.9, $\beta_2$=0.999 and $\varepsilon$=$10^{-8}$.

Figure 5:
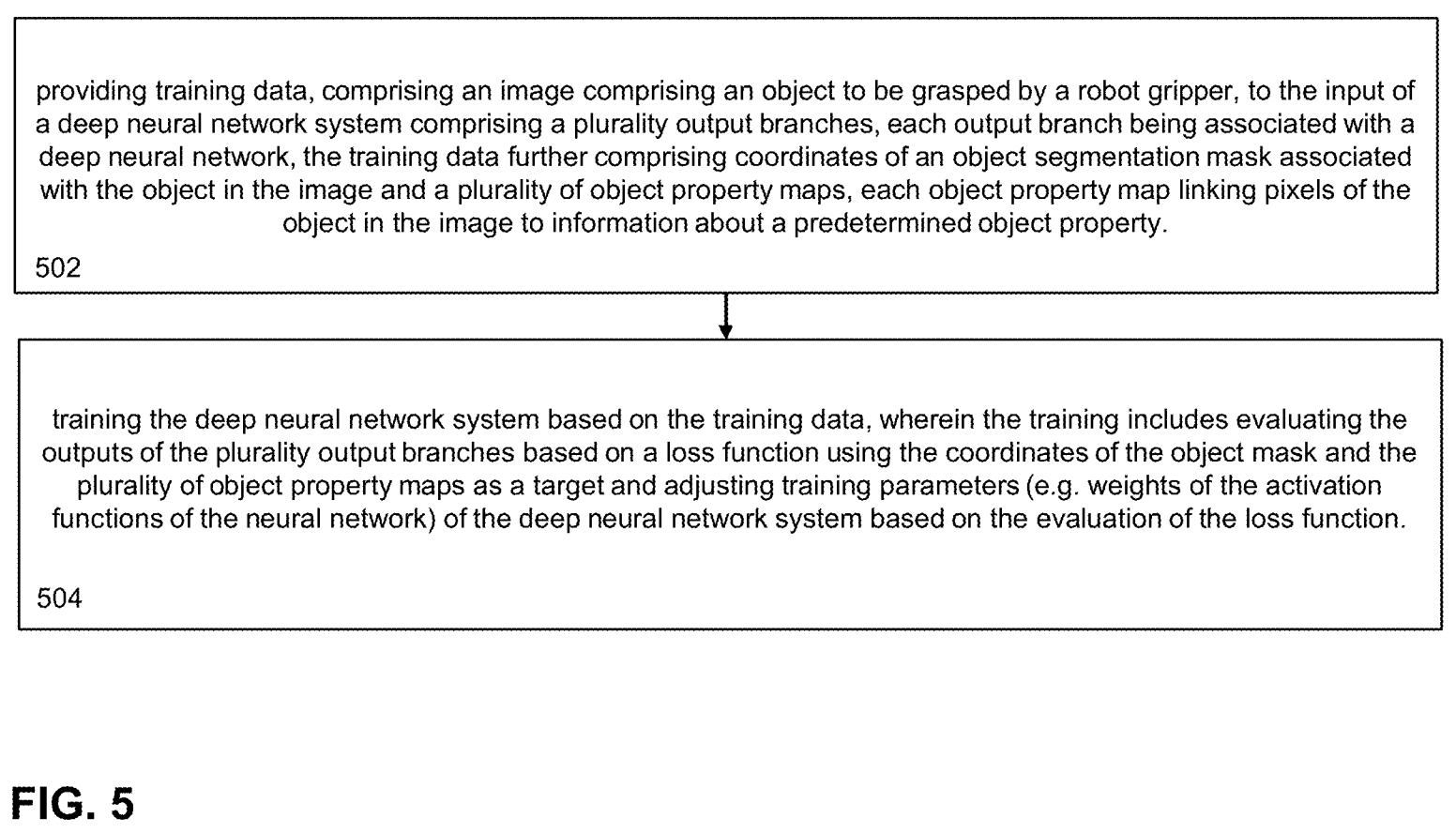

FIG. 5 depicts a method for training a neural network based on labelled training data according to an embodiment. This process may be executed by the training module based on training data that may be generated by the training data generator as described with reference to FIGS. 1 and 2. As shown in FIG. 5, in a first step 502 training data, comprising an image comprising an object to be grasped by a robot gripper, is provided to the input of a deep neural network system comprising a plurality output branches, each output branch being associated with a deep neural network, the training data further comprising coordinates of an object segmentation mask associated with the object in the image and a plurality of object property maps, each object property map linking pixels of the object in the image to information about a predetermined object property.

Then, the deep neural network may be trained based on the training data (step 504), wherein the training includes evaluating the outputs of the plurality output branches based on a loss function using the coordinates of the object mask and the plurality of object property maps as a target and adjusting training parameters (e.g. weights of the activation functions of the neural network) of the deep neural network system based on the evaluation of the loss function.

The minimization and adjustment of the training parameters may be based on well-known algorithms such as backpropagation and gradient descent. Preferably, the evaluation of the output may include minimizing a loss function, wherein the loss function includes a first loss function associated with the segmentation mask and a plurality of second loss functions associated with the plurality of object property masks. These loss functions are related to the training of the deep neural networks associated with the plurality of output branches of the deep neural network system.

The network may be trained based on a training set as described with reference to FIG. 1. The training data includes of an RGB image 402, a list of (segmentation) object mask coordinates 413, a list of corresponding classes 408 and the grayscale images of the property maps $412_{1-3}$. Here, a set of object mask coordinates may define the outline of an object in the RGB image. The RGB image is meant as the input for the network. The rest of the data is used to create the training targets for the deep neural network system 400 representing the object property map generator. While the outline of a polygon may determine the segmentation masks for each object, the outermost coordinates of the polygon may be used to create the target bounding boxes. The resulting segmentation masks may be used to cut the target property maps from their image data.

The deep neural network system may be trained based on the training data by minimizing a specific loss function. Based on the evaluation by the loss function, training parameters (e.g. weights of the activation functions of the neural network) may be adjusted using well-known algorithms that are based on backpropagation and gradient descent. For a neural network system like Map-Grasp that executes multiple data processing functions at the same time, the total loss is a multi-task loss computed based on the sum of losses produced by each of the output branches. Since a single pass through the network produces multiple RoI, the loss for each output branch is the sum of losses for each RoI.

Figure 6:
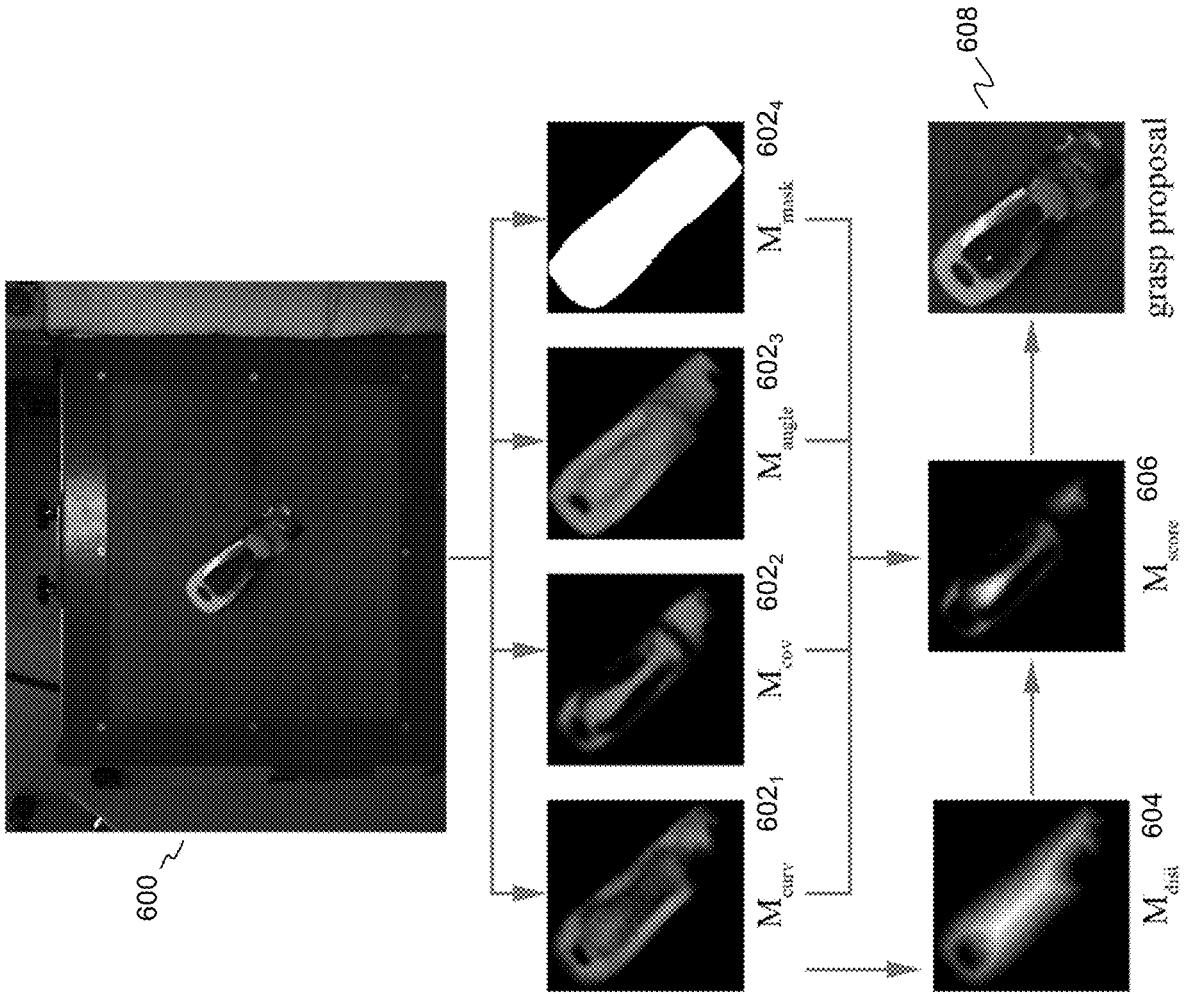
FIG. 6 illustrates the formation of a grasp proposal according to an embodiment.

FIG. 6 illustrates the formation of a grasp proposal according to an embodiment. In particular, the figure illustrates a method to determine on optimal grasping location. A grasp proposal 608 may be determined based on the object property maps $602_{1-4}$ generated by the trained neural network. In some embodiments, a further object property map 604, which may be referred to as a distance map $M_{dist}$, may be determined based on the curvature map $M_{curv}$. The distance map may be computed by calculating for each nonzero value in the curvature map $M_{curv}$ a Euclidean distance to the nearest 0 value. Thereafter, the map may be normalized to create the distance map $M_{dist}$. The purpose of the distance map is to add a bias towards the center of the largest graspable region. Thereafter, a grasp score map $M_{score}$ 606 may be determined based on the distance map and the object property maps. In an embodiment, the grasp score map may be determined by elementwise multiplication of the object property maps. Grasp parameters, e.g. a vector for spatially controlling the robot gripper, may be determined based on points of the point cloud at the location of the highest scoring grasp in the grasp score map. The grasp parameters may then be used by the robot controller to control the robot arm based on the grasp parameters. The grasp parameters determined by the system on the basis of the object property maps may be referred to as a grasping policy.

Figures 7A, 7B:
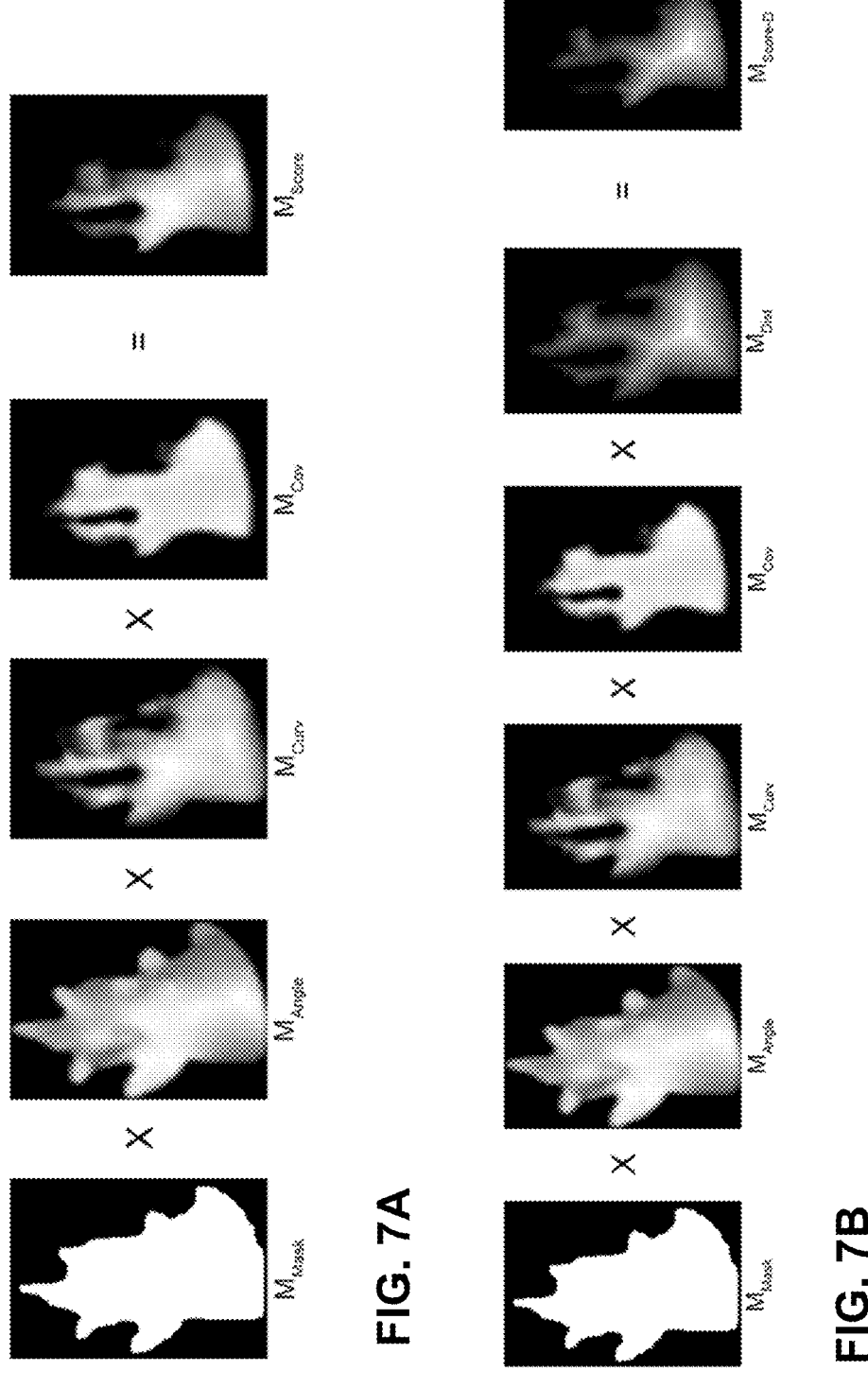
FIG. 7A-7D depict a method of determining a grasp proposal based on object property maps according to an embodiment of the invention.

FIG. 7A-7D depict a method of determining a grasp proposal based on object property maps according to an embodiment. The property maps generated by the trained deep neural network may form the basis for the grasp proposal generation. For example, in a first embodiment, a grasp proposal may be computed on the basis of the property maps may be realized by elementwise multiplication (as shown in FIG. 7A). A first score map $M_{score}$ may be calculated where the highest value(s) in the map corresponds to the best grasp proposal (equation 8):

$$M_{Score} = M_{Mask} * M_{Angle} * M_{Curv} * M_{Cov}$$

Further, specific combinations of object property maps may be used to tweak the proposed location towards specific locations. For example, when computing the first score map $M_{score}$, the size of the gripper is not taken into account. To address this point, in a further embodiment, the distance property map $M_{Dist}$ may be computed, which can be used to prioritize graspable area and find a location that can fit the biggest gripper. The object distance map may be created based on the curvature map by determining for each nonzero pixel the distance to the nearest zero value. By multiplying the first score map $M_{score}$ with the distance map $M_{Dist}$ a second score map $M_{score-D}$ can be created to determine a grasp proposal location with a bias towards a graspable area (equation 9):

$$M_{Score-D} = M_{Mask} * M_{Angle} * M_{Curv} * M_{Cov} * M_{Dist}$$

An example of such second score map $M_{score-D}$, is shown in FIG. 7B.

For a gripper with a single point of contact, it might be preferable to determine a grasp location that in line with the object's center of gravity. In that case, in a third embodiment, a third score map $M_{score-D}$ may be created which allows estimation of the location of the center of gravity (CoG) of an object based on the segmentation mask $M_{Mask}$. The estimated center of gravity may be calculated by assuming uniform density of the object and determining the average coordinates x,y where values of $M_{Mask}$ are one. Then, a center of gravity map $M_{Cntr}$ may be created by calculating the Euclidean distance of each pixel to the estimated center of gravity and normalizing the values to a value between 0 and 1. This way, a third score map $M_{score-c}$, with a bias towards the CoG, may be calculated by element-wise multiplication of each pixel in the individual property maps (equation 10):

$$M_{Score-C} = M_{Mask} * M_{Angle} * M_{Curv} * M_{Cov} * M_{Cntr}$$

Figures 7C, 7D:
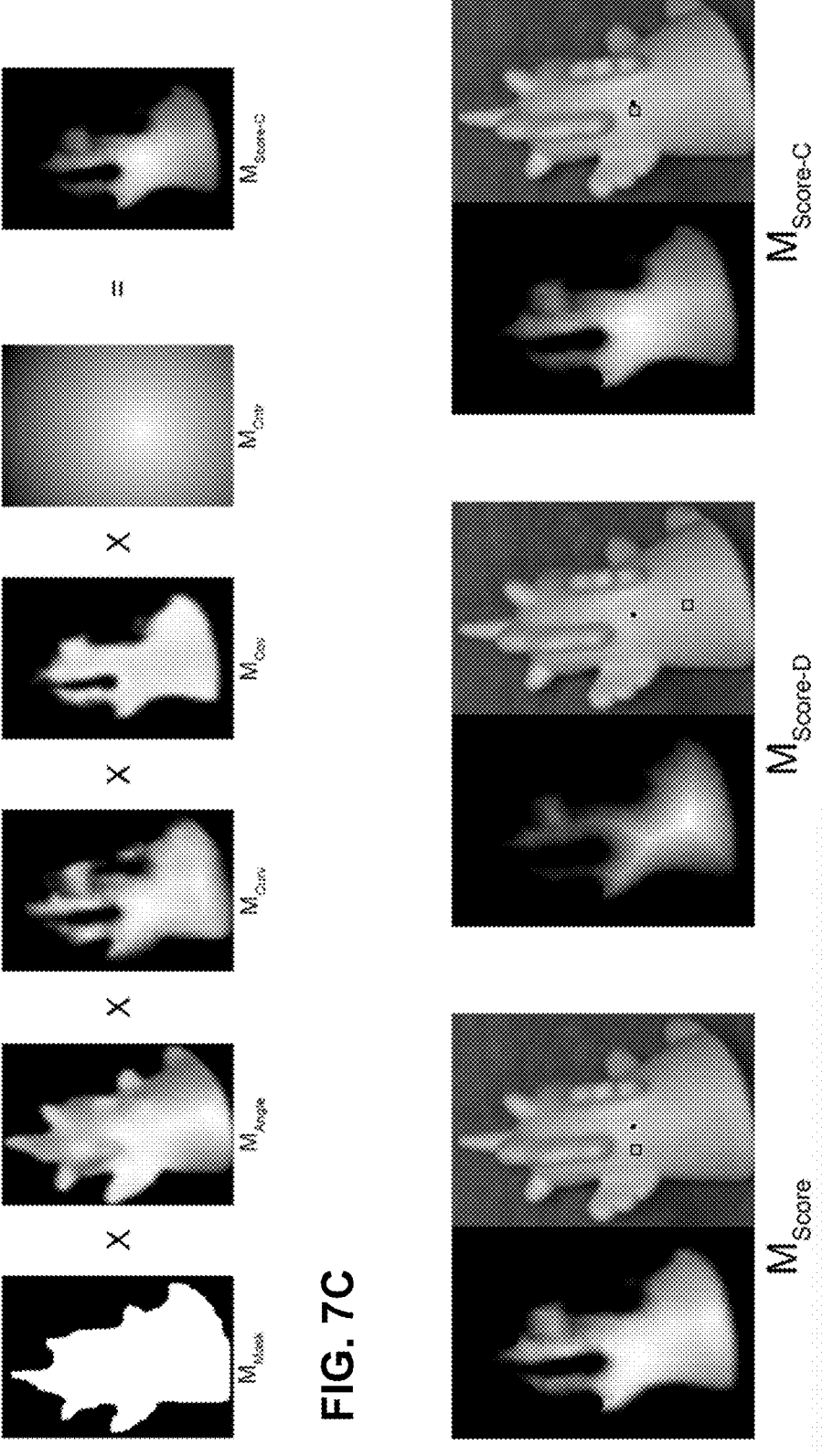

The use of the center of gravity map $M_{Cntr}$ and the resulting third score map $M_{score-D}$ is depicted in FIG. 7C.

The grasp proposals for the score maps of FIG. 7A-7C are shown in FIG. 7D, wherein the green dots represent grasp proposals $702_{1-3}$ for each score map and the black dots $702_{1-3}$ represent the object's estimated center of gravity.

The location of each proposal corresponds to the pixel with the highest value in the score map. The influence of $M_{Dist}$ and $M_{Cntr}$ can clearly be seen in the proposal locations of $M_{score-D}$ and $M_{score-c}$ respectively. The use of a bias property map such as of $M_{Dist}$ and $M_{Cntr}$ are useful for tweaking the grasp proposal towards specific locations based on preferences.

In a further embodiment, weights may be given to property maps. If some property maps are deemed more important than others, the score map calculation can be changed to include a weighted average of the property maps (equation 11):

$$M_{score-\lambda} = M_{mask} * \frac{\lambda_1 M_{angle} + \lambda_2 M_{curv} + \lambda_3 M_{cov} + \lambda_4 M_{dist} + \lambda_5 M_{cntr}}{\sum_{i=1}^{5} \lambda_i}$$

In the calculation of the weighted average mask $M_{score-\lambda}$, $M_{Mask}$ is kept outside of the weighted average because it is a binary value meant for excluding locations that are not part of the object.

The experiments are performed without a bias towards object center because the objects are estimated to be small and light enough to not need this bias. All other property maps were deemed equally relevant so the score maps were calculated using equation 9.

It may happen that a proposed grasp cannot be executed by the robot. For example, a reflective material may create a "hole" in the point cloud or an external collision check may determine that the robot cannot reach the desired location. In these cases, it is preferable to determine a set of grasp proposals as fallback positions. Hence, in that case, multi-grasp selections may be determined. Simply taking the next highest-scoring location from $M_{score}$ is not a viable method for selecting backup grasps. The problem with relying on locations that are ranked this way will likely be clustered around the first (highest scoring) location and probably will be subject to the same problem that led to the rejection of the first proposal.

To avoid selecting the backup grasp proposal clustered around (are within a certain distance from the first grasp proposal), the score map may be divided into regions of similar scores. Since all values in $M_{score}$ are between 0 and 1, the values may be multiplied it with a constant $\lambda$ and rounded to the nearest integer. The amount and size of the resulting regions may vary depending on the choice of $\lambda$. The backup grasp proposals are then selected by taking a single grasp proposal from within each region.

FIG. 8 illustrates a method for determining a grasp proposal according to an embodiment. The method may start with capturing image data representing one or more objects to be grasped by a robot gripper (step 802). Here, the image data may include an image, e.g. an RGB image and point cloud data representing the surfaces of the one or more objects. The image may be provided to a trained neural network that is trained to generate one or more object property maps based on the image, wherein each object property map includes information about a grasping property of the object for each location in the image (step 804).

An object property map may be a pixelated image that is associated with the 2D image of the object, wherein the value of each pixel (or group of pixels) of the object property map may comprise information about a grasping property of the object. For example, the object property maps may include a pixelated segmentation mask wherein a pixel value of the segmentation map determines if a pixel belongs to an object or the background of the object. The object property maps may further include a pixelated angle property map wherein a pixel value of the angle map property represents an (normalized) angle $\theta_{x,y}$ between the z-axis in the world-frame (usually parallel to the robot approach path, e.g. the z-axis that is parallel to the direction of gravity) and a vector that is normal to the surface of the object at the pixel location The object property maps may also include a pixelated curvature property map wherein a pixel value of the curvature property map may represent a (primary) curvature of the of the object at the pixel location. In yet another embodiment, the object property maps may include a pixelated coverage property map wherein a pixel value of the curvature property map may be used to find edges and overhanging surfaces of an object.

Some object property maps may be derived from another object property map that is generated by the trained deep neural network, for example, a distance property map may be constructed based on the curvature property map, wherein for each non-zero pixel value of the curvature map a distance, e.g. the Euclidean distance, to the nearest zero pixel value is computed.

Thereafter, a grasp proposal is determined for a controller of the robot gripper based on generated one or more object property maps (step 806). Here, a score map may be determined based on combining information of object properties from different object property maps. In an embodiment, information of the object property maps may be combined by pixel-wise multiplication of the values in the object property maps. The grasp parameters are then retrieved from the captured point cloud at the location of the highest scoring grasp in the score map.

Hence, the object grasping scheme uses a network architecture that performs object detection and generates object property maps based on the training data, and a separate decision-making algorithm that uses the network output to determine where to grasp. The decision-making algorithm is an algorithm that does not require training based on training data. Hence, the algorithm is an algorithm that does not require training of a mathematical model such a machine learning model or a deep learning model. This way, the decision of where to grasp is removed from the deep neural network to allow for more flexibility in gripper choice without the need to re-train the network.

The deep neural network system may include a first deep neural network system configured to generate Regions of Interests ROIs based on an image. The deep neural network further includes a second deep neural network system including multiple branches, wherein a first branch is a deep neural network configured to predict the class and a bounding box for a ROI, a second branch is a deep neural network configured to predict a mask for each ROI, and one or more further branches including deep neural networks configured to generate the different object property maps. Hence, this way, the deep neural network system is configured to efficiently determine a segmentation map and the object property maps of an object that is in an image. The deep neural network system may use an architecture that is similar to the mask-RNN with the addition of the branches that are configured to generate the object property maps. Such deep neural network architecture has proven to be very fast and efficient, which is important for real-time generation of grasp proposals.

Experiments were preformed to compare the performance of Mask-Grap with a baseline method. In particular, the grasp parameters determined based on the object property maps are compared to grasp parameters that are determined based on a baseline method, in this case a state-of-the art bin-picking method referred to as Patch-grasp, a proprietary algorithm by Fizyr, that is configured to sample and evaluate the surface of a point-cloud to produce grasp proposals. The algorithm is designed for dealing with unknown objects of complex shapes. The tests are performed using a UR5 robot arm with a custom swivel gripper and a 25 mm, double-bellow suction cup. An ENSENSO N35 combined with an IDS-uEye camera is used to collect the RGB and Depth data. The robotic system is powerd by Arch Linux 4.18.5 with a i7-6700 CPU and an NVIDIA Geforce GTX 1080 Ti GPU.

The experiment was performed based on 66 different objects of varying grasping difficulty. Out of these objects, 36 were included in the training dataset for Map-grasp, while the other 30 were not seen before by the network. The training set is then used to train the neural network system of Mask-Grap as described with reference to FIGS. 4 and 5. Thereafter, in the inference phase, between 4 and 12 objects were randomly selected and emptied into a box onto the testing area to create a cluttered arrangement of objects. Then, images of the object arrangement are captured and provided to the grasp proposal system.

Thereafter, the robot is controlled based on one of the grasping proposals until it is no longer capable of determining grasp proposals. A grasp attempt is deemed successful when the object is safely transported by the robot to a deposit area next to the robot. For each object, a policy allows a maximum of three attempts before the object is manually removed from the testing area. Each failed attempt is logged as either a first, second or third strike. Any object left in the testing area when the policy is no longer able to detect any more grasps is tagged as 'skipped' for that trial. After testing Patch-grasp on 65 bins, the same object layout was carefully rebuilt for the Map-grasp experiments. Both methods use the Map-grasp network to generate the segmentation masks to ensure a more fair comparison between the grasping methods.

Both grasp methods were tested on a total of 555 objects over 65 bins, collecting data of approximately 700 grasp attempts for both methods.

1) Object performance: the success rate between both schemes were compared. Patch-grasp managed to clear 75.50% (419/555) of the objects on the first attempt and gets a 83.78% (465/555) total success rate when given three attempts per object. Map-grasp outperforms Patch-grasp with a 82.16% (456/555) first-try success rate and a clear rate of 89.73% (498/555) of the objects when allowed three attempts.

2) Grasp performance: Table I shows the per-grasp performance, looking at the precision, recall and accuracy of the methods for different amounts of attempts allowed per object.

| Grasp policy | Max attempts | Metric | | |
|---|---|---|---|---|
| | | Prec (%) | Rec (%) | Acc (%) |
| Patch-grasp | 1 | 80.27 | 75.50 | 63.68 |
| | 2 | 72.00 | 81.08 | 61.64 |
| | 3 | 66.71 | 83.78 | 59.09 |
| Map-grasp | 1 | 85.44 | 82.16 | 71.36 |
| | 2 | 78.53 | 88.29 | 71.12 |
| | 3 | 73.89 | 89.73 | 68.13 |

Grasping performance comparison of the two grasping policies. Map-grasp has the best overall performance with 71.36% accuracy and 84.44% precision at a single attempt per object. Allowing for more attempts per object increases recall while lowering precision with diminishing returns after the second attempt.

The results show that the map-grasp method consistently outperform patch-grasp with a precision of 84.44% and 71.36% accuracy when given a single attempt per object. Increasing the amount of attempts allowed per object also increases the recall for both methods at the cost of precision.

Table II shows the F-scores calculated from the results for map-grasp. If precision is twice as important as recall, the table shows that that map-grasp gets its best F0.5-score at a maximum of one attempt per object.

| Max attempts | Metric | | |
|---|---|---|---|
| | $F_{0.5}$ | $F_1$ | $F_2$ |
| 1 | 0.840 | 0.833 | 0.826 |
| 2 | 0.803 | 0.831 | 0.862 |
| 3 | 0.766 | 0.810 | 0.860 |

The F2-score values recall over precision. In this case, it is better to allow the policy to retry grasping objects with the best results at two attempts per object. If precision and recall are equally important, the F1-score is also best at a maximum of one attempt. When recall is twice as important, it is best to allow a maximum of two attempts per object.

The performance of the policies were also examined for known and unknown items. No distinction was made between the two categories while constructing the bins but separate the per-object data afterwards. The Map-grasp method outperforms patch-grasp on the known objects. Map-grasp significantly outperforms Patch-grasp on the known items with a success rate of 92.79% (283/305) against 82.30% (251/305). For the unknown items, their performance is almost equal with a success rate of 85.60% (214/250) for Map-grasp against Patchgrasp's 86.00% (215/250). The performance of Mask-grasp for unknown object may be improved by improving the training dataset, either by recording more data or improving the quality of the data generation.

Figure 9:
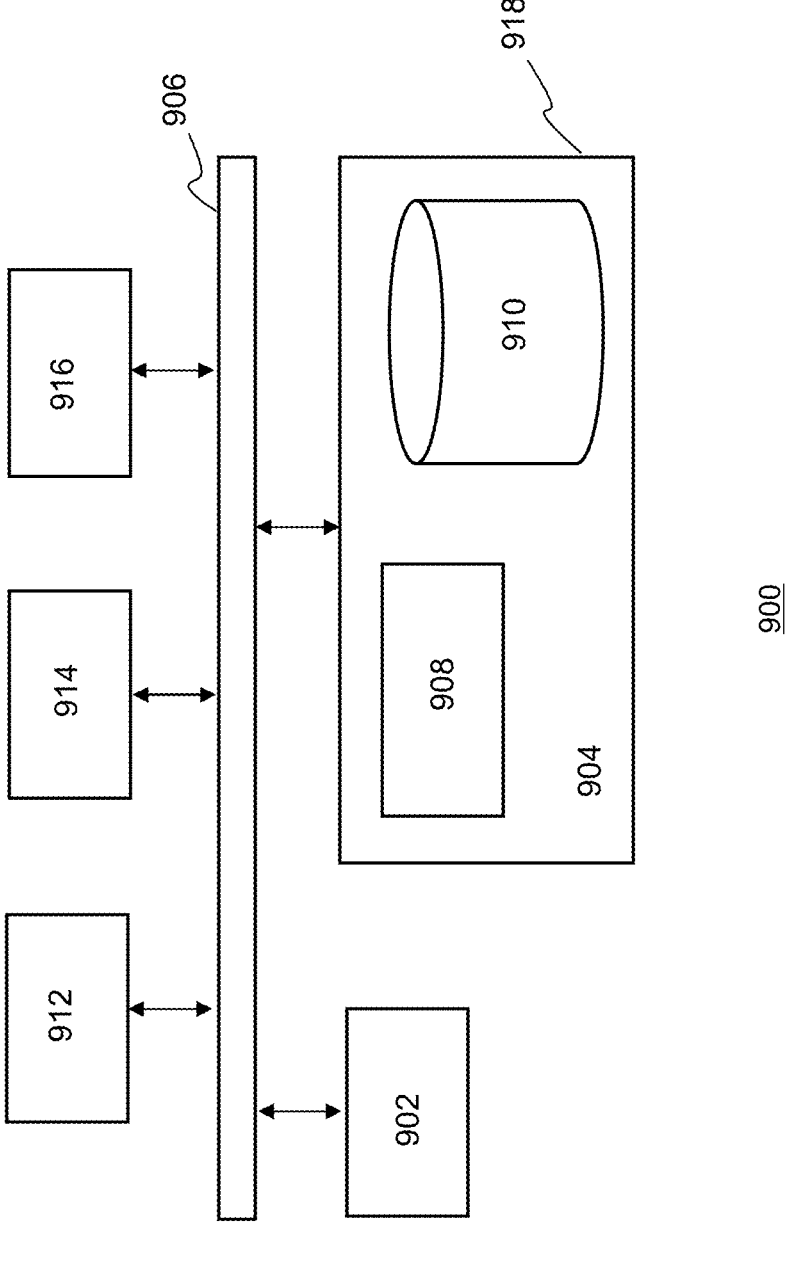
FIG. 9 is a block diagram illustrating an exemplary data processing system that may be used for executing methods and software products described in this application.

FIG. 9 is a block diagram illustrating an exemplary data processing system that may be used for executing methods and software products described in this application. Data processing system 900 may include at least one processor 902 coupled to memory elements 904 through a system bus 906. As such, the data processing system may store program code within memory elements x04. Further, processor 902 may execute the program code accessed from memory elements x04 via system bus 906. In one aspect, data processing system may be implemented as a computer that is suitable for storing and/or executing program code. It should be appreciated, however, that data processing system 900 may be implemented in the form of any system including a processor and memory that is capable of performing the functions described within this specification.

Memory elements 904 may include one or more physical memory devices such as, for example, local memory 908 and one or more bulk storage devices 910. Local memory may refer to random access memory or other non-persistent memory device(s) generally used during actual execution of the program code. A bulk storage device may be implemented as a hard drive or other persistent data storage device. The processing system 900 may also include one or more cache memories (not shown) that provide temporary storage of at least some program code in order to reduce the number of times program code must be retrieved from bulk storage device 910 during execution.

Input/output (I/O) devices depicted as input device 912 and output device 914 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 916 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 900.

As pictured in FIG. 9, memory elements 904 may store an application 918. It should be appreciated that data processing system 900 may further execute an operating system (not shown) that can facilitate execution of the application. Application, being implemented in the form of executable program code, can be executed by data processing system 900, e.g., by processor 902. Responsive to executing application, data processing system may be configured to perform one or more operations to be described herein in further detail.

In one aspect, for example, data processing system 900 may represent a client data processing system. In that case, application 918 may represent a client application that, when executed, configures data processing system 900 to perform the various functions described herein with reference to a "client". Examples of a client can include, but are not limited to, a personal computer, a portable computer, a mobile phone, or the like.

In another aspect, data processing system may represent a server. For example, data processing system may represent an (HTTP) server in which case application 918, when executed, may configure data processing system to perform (HTTP) server operations. In another aspect, data processing system may represent a module, unit or function as referred to in this specification.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of determining a grasp proposal for object picking by a robot gripper comprising:

capturing an image comprising an object to be grasped by the robot gripper;

providing the image to an input of a deep neural network system that is trained to generate an object segmentation map for identifying pixels in the image that are associated with the object and that is trained to generate a plurality of object property maps associated with the object segmentation map, the plurality of object property maps being distinct from the object segmentation map, each object property map linking each pixel of the object that is identified by the object segmentation map to information about a predetermined object property; and, determining a grasp proposal for a controller of the robot gripper using an algorithm and one or more generated object property maps generated by the deep neural network system, wherein the algorithm is not based on a trainable model.

2. The method according to claim 1 wherein an object property map defines a pixel-labelled image wherein each pixel value of the object property map defines a measurable object property at a corresponding pixel location of the image.

3. The method according to claim 1 wherein the plurality of object property maps comprises an angle property map wherein a pixel value of the angle map-property map that is associated with the object includes information about an angle $\theta_{x,y}$ between an axis parallel to a path along which the robot gripper approaches the object in a world-frame of the object and a vector that is normal to a surface of the object at a corresponding pixel location of the image.

4. The method according to claim 1 wherein the plurality of object property maps comprises a curvature property map wherein a pixel value of the curvature property map that is associated with the object includes information about a curvature of the object at a corresponding pixel location of the image.

5. The method according to claim 4 wherein the plurality of object property maps comprises a distance property map which is computed based on the curvature property map, wherein for each non-zero pixel value of the curvature property map a distance to a nearest zero pixel value is computed.

6. The method according to claim 4 wherein the plurality of object property maps comprises a coverage property map wherein a pixel value of the curvature property map that is associated with the object includes information about an edge and/or an overhanging surface of the object at the corresponding pixel location of the image.

7. The method according to claim 1 wherein determining a grasp proposal further includes:

determining a score map by combining information of different object property maps; and determining one or more surfaces of the object based on the score map.

8. The method according to claim 1 wherein the deep neural network system is configured to simultaneously generate the object segmentation map and the plurality of object property maps.

9. The method according to claim 1 wherein the image may include a 2D image frame and a point cloud.

10. The method according to claim 1 wherein the deep neural network system comprises a plurality output branches, each output branch being associated with a deep neural network that is trained to generate one of the plurality of object property maps.

11. The method according to claim 1 wherein the trained deep neural network system is configured to simultaneously generate the object segmentation map and the plurality of object property maps.

12. A method of training a deep neural network for object picking by a robot gripper comprising:

providing training data, comprising an image comprising an object to be grasped by the robot gripper, to an input of a deep neural network system comprising a plurality output branches, each output branch being associated with a deep neural network, the training data further comprising coordinates of an object segmentation map associated with the object in the image and a plurality of object property maps associated with the object segmentation map, the plurality of object property maps being distinct from the object segmentation map, each object property map linking each pixel of the object that is identified by the object segmentation map in the image to information about a predetermined object property; and, training the deep neural network system based on the training data, the deep neural network being trained to generate an object segmentation map for identifying pixels in the image that are associated with the object and to generate a plurality of object property maps, each object property map linking pixels of the object to information about a predetermined object property, wherein the training includes evaluating outputs of the plurality output branches based on a loss function using the coordinates of the object segmentation map and the plurality of object property maps as a target and adjusting training parameters of the deep neural network system based on the evaluation of the loss function.

13. The method according to claim 12 wherein the deep neural network system is trained to simultaneously generate an object segmentation map and a plurality of object property maps based on the image that is provided to the input.

14. A robot system configured to grasp an object comprising:

a robotic system including a controller for controlling a gripper for grasping one or more objects;

an imaging system for capturing images of the one or more objects;

a computer connected to the robotic system and the imaging system, the computer comprising a computer readable storage medium having computer readable program code embodied therewith; and a processor, coupled to the computer readable storage medium, wherein responsive to executing the computer readable program code, the processor is configured to perform executable operations comprising:

capturing an image representing an object to be grasped by the gripper;

providing the image to an input of a deep neural network system that is trained to generate an object segmentation map for identifying pixels in the image that are associated with the object and that is trained to generate a plurality of object property maps associated with the object segmentation map, the plurality of object property maps being distinct from the object segmentation map, each object property map linking each pixels of the object that is identified by the object segmentation map to information about a predetermined object property; and, determining a grasp proposal for the controller of the gripper using an algorithm and one or more generated object property maps generated by the deep neural network system, wherein the algorithm is not based on a trainable model.

15. A method of automatic generation of training data for training a deep neural network comprising:

capturing image data associated with an object to be picked up by a robot gripper, the image data including a 2D image and an associated point cloud;

determining a plurality of locations on the point cloud and using a patch fitting algorithm to fit points of the point cloud associated with each of the plurality of locations to a curved surface patch, each curved surface patch being associated with one or more patch parameters defining at least one of: an orientation of the curved surface patch in a reference frame of the object, a curvature of the curved surface patch, or, dimensions of the carved surface patch; and generating training data for training the deep neural network, wherein the generating includes determining one or more object property maps based on the one or more patch parameters, each object property map linking pixels of the object in the 2D image to information about a predetermined object property.

16. The method according to claim 15 wherein determining one or more object property maps includes:

determining an angle property map based on the one or more patch parameters defining an orientation of the curved surface patches in a reference frame of the object; and/or, determining a curvature property map based on the one or more patch parameters defining curvature of the curved surface patches.

17. A non-transitory computer-readable storage medium storing at least one software code portion, the software code portion, when run on a computer system, being configured for executing the method steps according to claim 1.

18. The method of claim 12 wherein adjusting training parameters comprises adjusting weights of activation functions of the deep neural network.

19. The method of claim 7 wherein combining includes pixel-wise multiplication of pixel values in the different object property maps.

20. The method of claim 9 wherein the point cloud is pixel-aligned with the 2D image frame.

\* \* \* \* \*